Oct. 2, 1962   O. HAUGWITZ   3,056,433
SYSTEM FOR HANDLING WIRE AND THE LIKE
Filed Dec. 13, 1957   5 Sheets-Sheet 1

Oct. 2, 1962     O. HAUGWITZ     3,056,433
SYSTEM FOR HANDLING WIRE AND THE LIKE
Filed Dec. 13, 1957     5 Sheets-Sheet 2
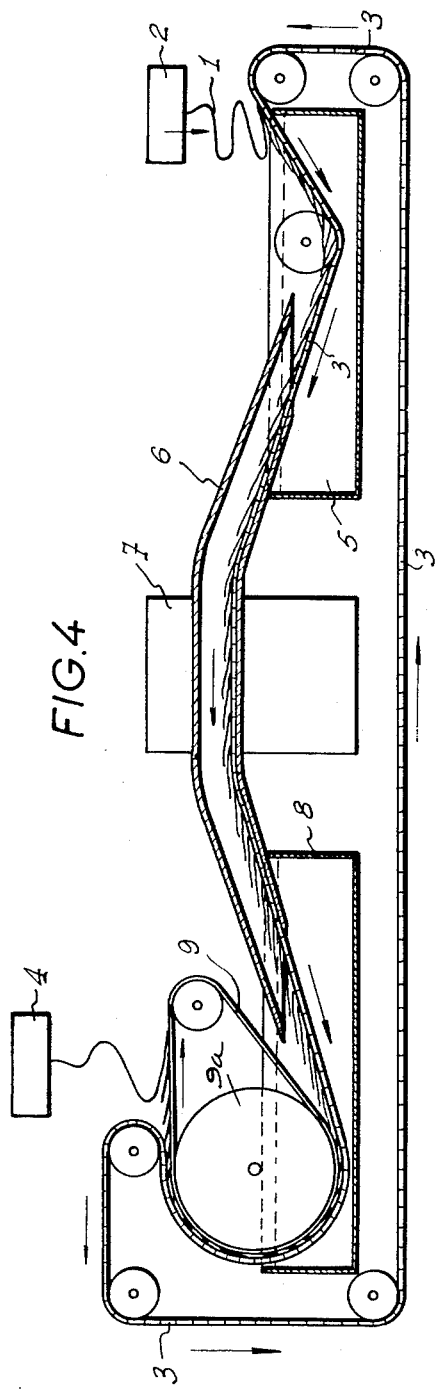
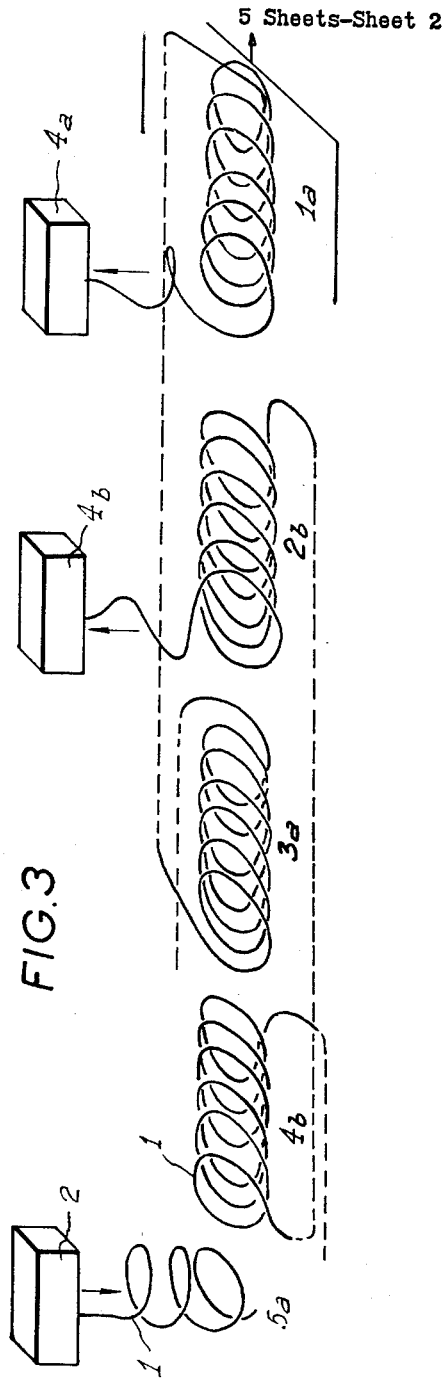

Oct. 2, 1962    O. HAUGWITZ    3,056,433
SYSTEM FOR HANDLING WIRE AND THE LIKE
Filed Dec. 13, 1957    5 Sheets-Sheet 3
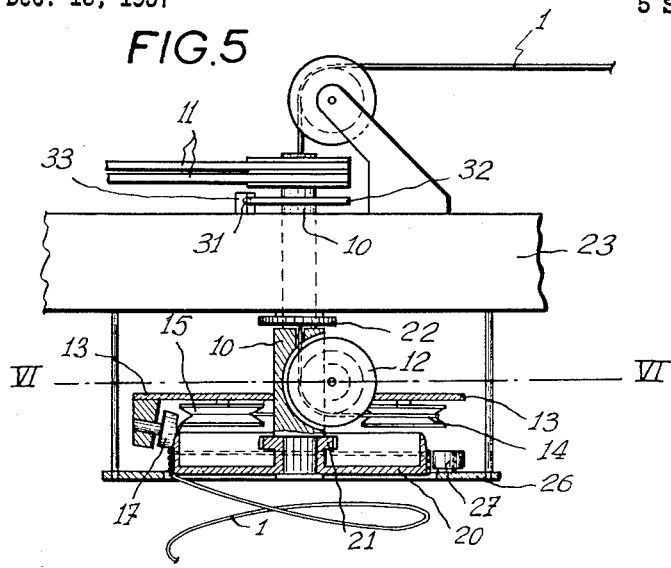
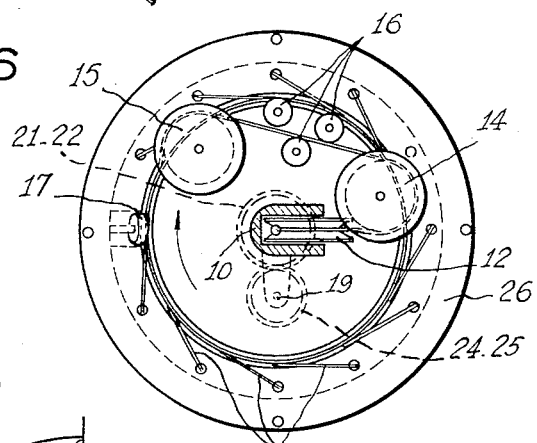
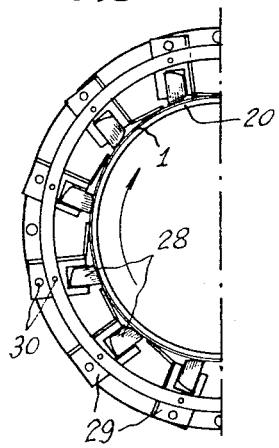
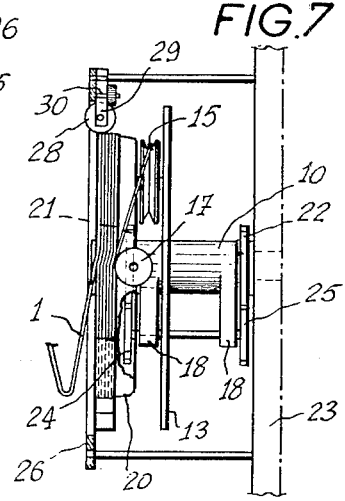

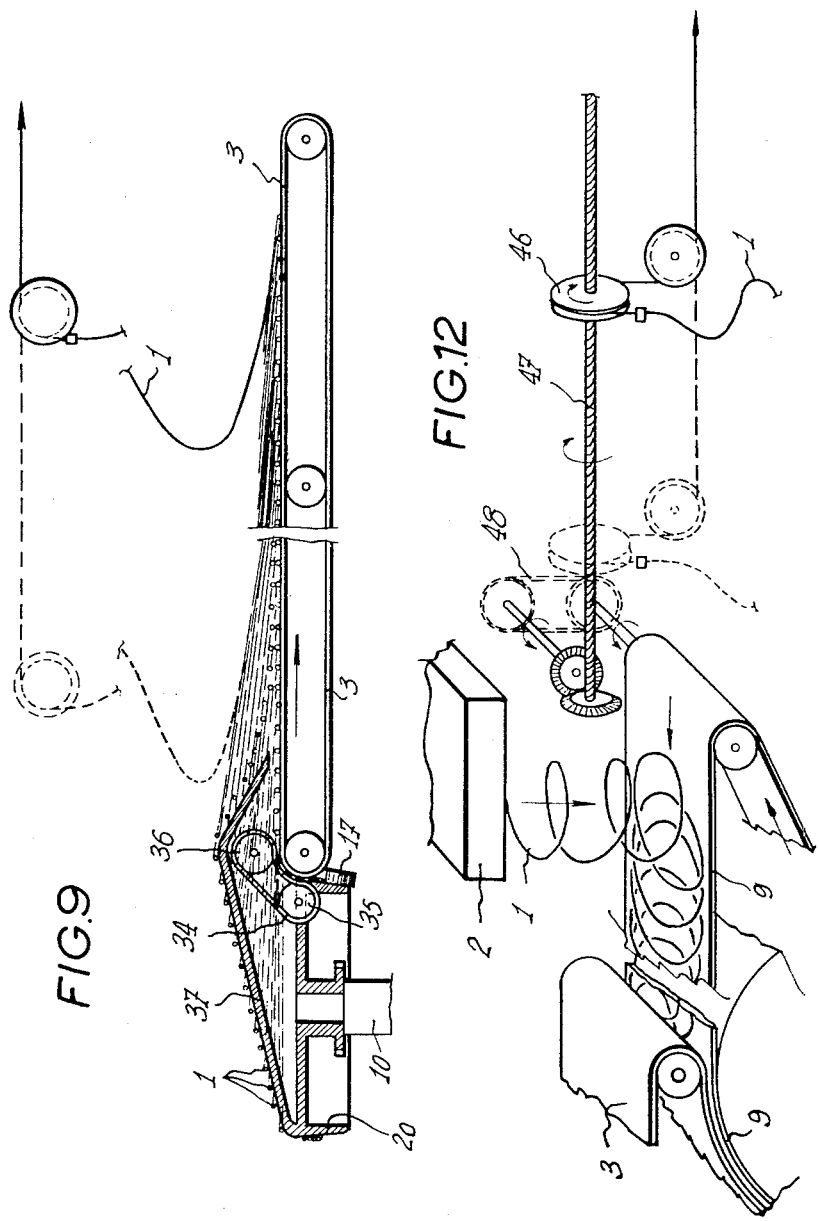

Oct. 2, 1962  O. HAUGWITZ  3,056,433
SYSTEM FOR HANDLING WIRE AND THE LIKE
Filed Dec. 13, 1957  5 Sheets-Sheet 5

United States Patent Office 3,056,433
Patented Oct. 2, 1962

3,056,433
SYSTEM FOR HANDLING WIRE AND THE LIKE
Otto Haugwitz, La Celle Saint Cloud, France, assignor to Société Anonyme Geoffroy-Delore, Paris, France, a French company
Filed Dec. 13, 1957, Ser. No. 702,644
Claims priority, application France Dec. 15, 1956
6 Claims. (Cl. 140—2)

This invention relates to means for handling, storing and moving continuous flexible elements such as wire, cables and the like.

In the manufacture of such elements (hereinafter designated as wire for convenience) it is frequently the case that some unit of apparatus delivering the wire continuously at a uniform rate of feed must supply the wire to another unit which is discontinuously operating, the average rate of take-up of wire by said latter machine being for example equal to the rate of output of the first machine; or again the first machine may have to supply more than one machines, operated continuously or discontinuously and having a lower rate of take-up.

In the first instance just considered, it is necessary to store the wire put out by the first machine during the idle periods or slow-operating of the second machine, and this is generally accomplished by accumulating the wire in a wire storage device somewhat resembling a pulley-block; however such devices are space consuming and their capacity is limited. They also require that the wire be threaded into the device and such operation takes time.

In the second case mentioned above, the wire has to be stored in coils, reels or cylinders and has to be cut into appropriate lengths. The stock of coils, reels or cylinders permanently takes up a large amount of floor space and requires handling to deliver the wire to the utilizing machines, this involving additional labour and time.

Objects of this invention include the elimination of the above difficulties, and the provision of a system for storing and handling wire whereby substantial savings in space, time and labor may be accomplished.

According to the invention, the wire as delivered from a continuous or intermittent feed-out station is cast off in loops which are laid down upon a supporting surface which is in relative motion with respect to said feed-out station. The wire is thus formed into a spread-out series of overlapping loops or turns on the supporting surface. The supporting surface can be stationary, e.g. the floor surface, and the feed-out device is then made displaceable or the surface may be that of a conveyor belt or similar displaceable support and the feed-out station then is stationary. A considerable length of wire can thus be stored over a comparatively short length of supporting surface.

The wire delivered to one end of the surface, e.g. one end of a belt conveyor, can be withdrawn from the other end or at any suitable point preferably by lifting off the wire in a direction coincident with the axis of the endmost loop i.e. normally to the surface.

Exemplary embodiments of the invention will now be described by way of illustration but not of limitation with reference to the accompanying diagrammatic drawings wherein:

FIGS. 1, 2 and 3 explain the invention in a purely diagrammatic way;

FIG. 4 illustrates the invention as applied to a wire heat treating system;

FIG. 5 illustrates in partial cross section apparatus for feeding out the wire in annular loops;

FIG. 6 is a section on line VI—VI of FIG. 5;

FIG. 7 is a side view of the same apparatus including a modified feature;

FIG. 8 is a plan view of a modified feed-out device;

FIG. 9 illustrates one embodiment of wire storing and handling apparatus according to the invention using a feed-out device of the kind shown in FIGS. 5 to 8;

FIG. 12 shows a modified system embodying a different form of take-up station.

Figure 1:
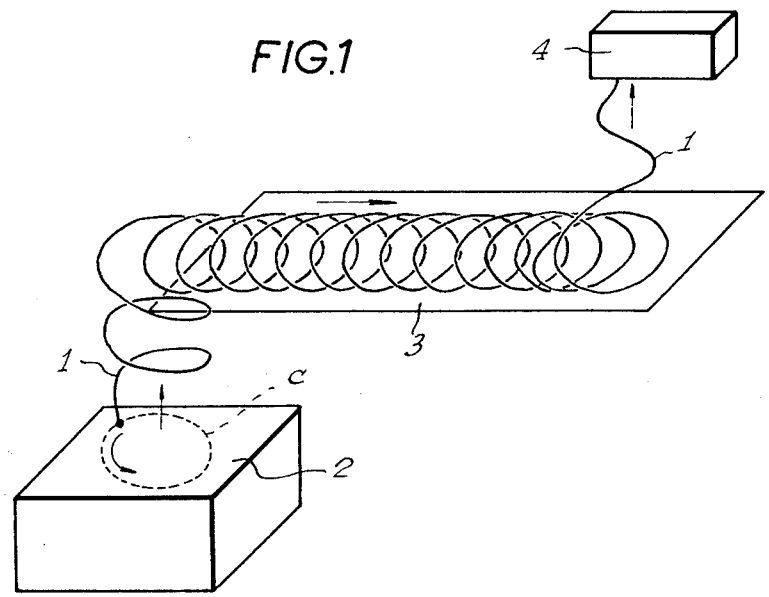

As shown schematically in FIG. 1, a wire handling system according to the invention generally comprises a wire feed-out unit 2 so arranged (in a manner to be later described in detail) that the geometric point from which the wire 1 is discharged out of the unit continually describes a closed, e.g. circular, curve C. The loops of wire thus cast off are deposited on a support 3 which is in relative motion relatively to the feed-out unit 2 in a direction generally transverse to the center axis of the curve C. The wire 1 is thereby cast on the surface 3 in a succession of overlapping loops. The wire is withdrawn as required from another point of the surface 3 at a take-up station 4.

It will be appreciated that a means of temporary wire storage of the kind thus described can make it possible to utilize a given storage area with maximum efficiency in a continuous manner. It will also be noted that the support serves a "flywheel" or "buffer" function in that it can be used in part or in full, and the point of wire withdrawal can be displaced as desired, within bounds, along said surface.

The particular shape of the curve C described by the feed-out point can be varied widely depending on requirements, and may for example be circular, oval or figure-8. Also the path of relative displacement of the support with respect to the feed-out station may assume any of various forms, e.g. rectilinear or arcuate.

Figure 2:
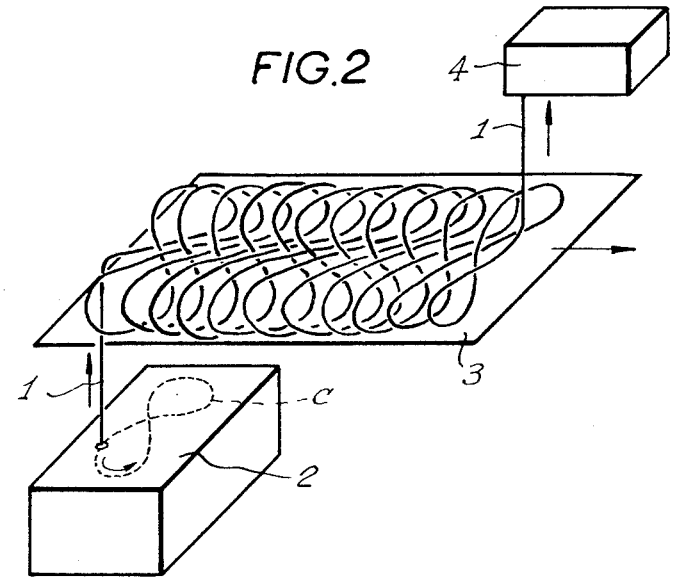

FIG. 2 illustrates a similar system as that just described except that a figure-8 curve C is here used, so that the overlapping loops cast down on the surface 3 also are figure-8. Such a system may be especially desirable where the element to be handled has substantial stiffness or resiliency, such as with wire rope or cable, so that it would not be convenient to subject it to continual one-way twisting.

FIG. 3 illustrates the application of the invention to a plurality, shown as two, machines to be supplied with wire from a single feed-out station. In this case the wire 1 cast down on a conveyer surface is cut to appropriate lengths to form a plurality of separate sets or batches of loops, which batches are alternately fed to one and the other of the two utilizing machines. Thus all odd batches may be delivered to a first machine and all even batches to a second. In this case the wire may be withdrawn from the trailing end of each batch, so that the last loop cast down is the first to be removed. The wire from each batch may be directly delivered to the associated machine so that further handling is eliminated. If desired, corresponding ends of the wire in all even batches, and corresponding ends in all odd batches, may be welded together respectively, as indicated by the dotted lines in FIG. 3, so as to provide unbroken lengths of wire and thereby eliminate odd ends and resulting waste.

Any suitable means may be used as the supporting surface, including belt conveyers (as already mentioned), chain conveyers, cable conveyers, caterpillar tables, and the like. It will be apparent moreover that the conveyer surface may be made to pass through any desired processing station on its way from the feed-out station to the take-up station. Thus the conveyer may be fed through a heat treating furnace for example.

The length of the conveyer and the number of loops deposited on it can readily be so predetermined as to permit the wire to dwell for comparatively long periods in such treating stations even in cases where the wire is fed at high speeds, in view of the large capacity of storage provided by the system of the invention.

Thus FIG. 4 illustrates such a system including means for annealing the wire in transit. The loops of wire 1 are cast off on the supporting surface 3 of a conveyer of the type comprising a plurality of transversely spaced chains. The chain conveyer 3 just beyond the feed-out station 2 dips down into a water tank 5, and while underwater enters into the inlet end of a rising tunnel 6 which extends through an annealing furnace 7 said tunnel beyond the furnace dipping down again into another water tank 8. Such an arrangement, conventional per se, is provided to prevent oxidation of the wire during annealing. The wire 1 stored in partly overlapping loops spread over the support 3 rises out of the output tank 8 and is then gripped between the support 3 and another conveyer 9, e.g. belt, which passes with the conveyer 3 around a drum 9a so as to be turned upside down for convenient removal at the take-up station 4. It will be understood that the means for depositing and removing the wire on and from the conveyer surface, as shown at the input and the output ends of the system of FIG. 4 are exemplary only, and may be reversed, relatively to the arrangement shown, or similar means may be used at both ends. It will further be noted that an auxiliary conveyer such as 9 can be arranged to present a relatively long flat upper leaf so as to serve as an auxiliary storage means for the wire.

While any suitable means may be used at the feed-out station to cause the point of discharge of the wire to describe a closed loop C, for example any of the means conventionally used for coiling wire in coils or cylinders, a preferred construction of feed-out unit will now be described in accordance with the invention with reference to FIGS. 5 to 7. The feed-out unit to be described makes it possible to attain comparatively very high feed-out rates in a reliable manner and with the use of only lightweight moving parts.

The feed-out device shown in FIGS. 5 to 7 comprises a vertically mounted rotatable shaft 10 journalled in suitable bearings of a frame 23 and driven in rotation through suitable means such as a belt drive 11, which shaft is formed with a central axial duct for passing the wire therethrough as will presently appear. Secured to the shaft near the lower end of it is a distributor disc 13 having guide pulleys 14 and 15 mounted for free rotation on spaced pivots projecting downward from the disc. A third guide pulley 12 is freely rotatable on a horizontal pivot secured to the disc 13 and projects, as clearly shown in FIGS. 5 and 6, into an arcuate cut formed in the shaft so that the bottom of the groove in pulley 12 is in tangent relation with the axial duct in the shaft. The disc 13 further carries a conventional wire-straightener device comprised of a set of offset rollers 16. Rotatably journalled on the lowermost end of shaft 10 is a winch sheave 20 of a generally cylindrical configuration, having a gear 21 integrally formed on the hub of it. The gear 21 is connected with a gear 22 secured on the frame 23 by way of a pair of gears 24, 25 secured on the opposite ends of a common shaft 19 rotatably supported in spaced bearing 18 secured to the disc 13. The arrangement just described is such that the winch sheave 20 is held stationary regardless of the rate of rotation of the shaft 10. A pusher roller 17 journalled in a support projecting from the underside of the periphery of disc 13 cooperates with the periphery of the winch sheave 20 in a manner to appear later. An annular array of spring plates 27 have their outer ends anchored at circumferentially spaced points of a ring-shaped member 26 fixedly supported through posts from the frame 23 so as to surround the lowermost circumference of the sheave 20 in spaced relation with it. The spring plates 27 are arranged to engage spaced points of the periphery of sheave 20 in tangent relation with it and under a predetermined flexional bias.

In operation, wire 1 is led down into the upper end of the axial duct in shaft 10 by way of an upper vertical guide pulley as shown. The wire is then trained around a lower section of the groove in lower vertical guide pulley 12, around a first one 14 of the two horizontal guide pulleys journalled on the disc, through straightener rollers 16 and around the other horizontal guide pulley 15, whence the wire is passed to the periphery of winch sheave 20, and is forcibly applied against said periphery by the action of the presser springs 27. On rotation of the assembly comprising shaft 10 and disc 13, at each revolution the pusher roller 17 pushes the turn of wire newly fed out from guide pulley 15 and thereby advances the entire set of turns present on the sheave downwards by an amount corresponding to the diameter of the wire. At the start of a wire feed-out operation a predetermined number of turns of wire are thus wound about the sheave 20, and thereafter at each revolution the lowermost turn is released from the periphery at the bottom of the sheave and cast free as indicated in FIG. 5, so as to be deposited upon the supporting surface in the manner previously described.

Preferably the winch sheave 20 is formed with a spherical surface in its portion extending from the top of the sheave to the lowermost point of pusher roller 17, the radius of the sphere being equal to that of the sheave, and the inwardly directed face of the roller 17 is contoured to conform accurately with the spherical surface of the winch so as to provide a small uniform clearance between the roller and the winch. This feature enables the device to be used with fine wire without danger of the wire being jammed between the roller and winch. The presser plates 27, in addition to holding the turns of the wire down in coiled condition about the sheave, also serve to prevent the adjacent turns from climbing over each other.

In a modified form of the feed-out device, the intermediate shaft 19 and gears 24 and 25 (as well as gears 21 and 22) are omitted, and part of the presser spring plates 27 are preferably replaced by rollers such as 28, see FIGS. 7 and 8. The rollers 28 are arranged to press down on the lowermost few turns of wire on the sheave so that, in case the sheave should tend to revolve under the effect of the pull of the wire the rollers 28 act to jam the wire against the sheave thereby blocking the turns of wire and the sheave, while still allowing the turns of wire to advance axially under the force of pusher roller 17. The rollers 28 are preferably rubber-lined to prevent damage to the wire.

To facilitate threading the wire through the device and prevent the wire from escaping out of the grooves of the various guide pulleys and other parts of the device in the event that the disc 13 should be backed for any reason and thereby impart slack to the wire, a slack-preventing device is preferably provided. Such device may in one simple form comprise a ball 31 (FIG. 5) adapted to be jammed between a flange 32 secured on shaft 10 and a post 33 projecting from frame 23, the ball being spring pressed into engagement with the flange 32.

It will be understood that the wire feed-out device just described may well find other uses than at the input end of a wire storing and conveying system according to the invention. Thus, it may be used for coiling wire in cylinders, e.g. at the output end of a storing system according to the invention, and also as independent unit in its own right quite aside from a wire storing and conveying system of the kind herein described.

FIG. 9 illustrates a wire storing and conveying system of a general type similar to that diagrammatically shown in FIG. 1, embodying a feed-out mechanism of the kind described in connection with FIGS. 5 to 8. As shown, a belt conveyer 3 has one end arranged in tangential relation with the endmost few turns of wire on the winch sheave 20, here shown as mounted in inverted position from that shown in FIG. 5. An auxiliary belt 34 trained between pulleys 35, 36 mounted under a guide member 37 secured to and projecting from the sheave 20, serves to clamp one portion of the turns of wire 1, progressively as they are cast off by the sheave, against the belt 3. The opposite portions of the turns, i.e. the portions remote from the belt 3, are caused to slide over the upper surface of guide member 37 as illustrated, and are guided down towards the upper surface of belt 3 so that the successive turns are neatly deposited in overlapping relationship with a relative displacement between adjacent turns which depends on the rate of displacement of the belt 3 and the rate of feed-out of the wire from the sheave 20. The turns are removed from the belt 3 at any suitable point thereof as illustrated.

Figure 10:
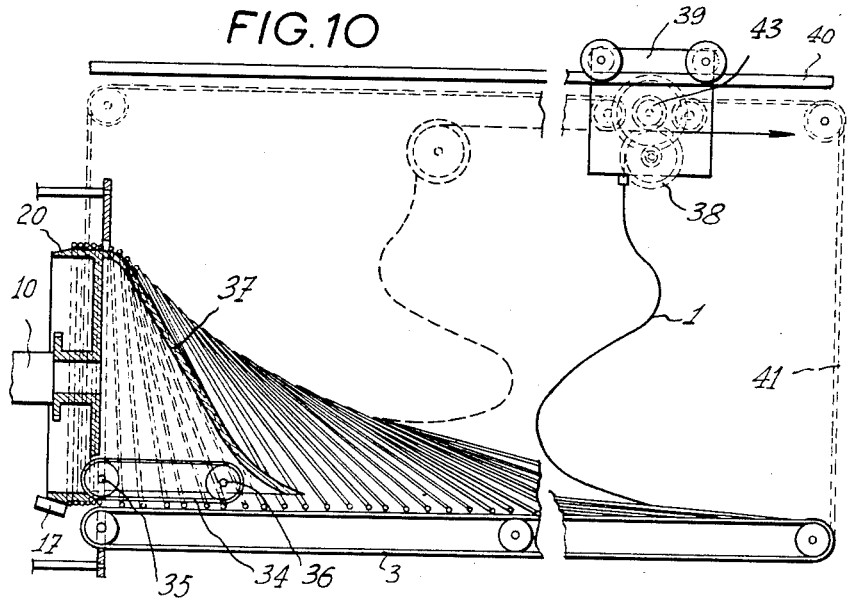
FIGS. 10 and 11 illustrate another embodiment of such apparatus embodying one form of a wire take-up station adapted to remain at all times positioned directly above the endmost of one of the loops on the surface.
Figure 11:
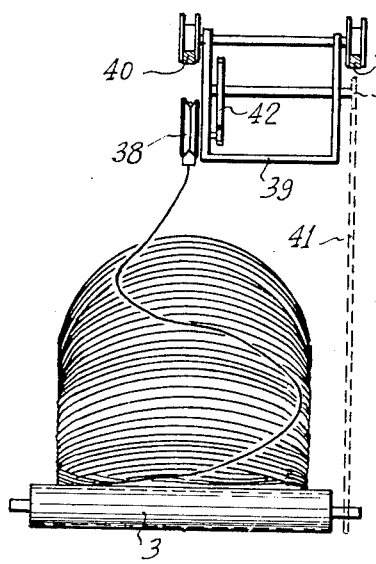

In the system shown in FIGS. 10 and 11, the feed-out device is mounted so that the axis of winch 20 is horizontal. The loops of wire are caused to slide over the surface of guide member 37 which in this case is provided with a somewhat different contour than that shown in FIG. 9 though it fulfills the similar function in both cases.

Means are shown in FIGS. 10 and 11 for ensuring that the wire is withdrawn at the take-up station of the system in a direction substantially concident with the axis of the endmost loop on the surface. These means comprise a take-up pulley 38 journalled on a carriage 39 suspended from overhead ways 40. A sprocket chain 41 is driven simultaneously with belt 3 from the belt driving mechanism. The wire 1 is trained over the pulley 38 and the pulley through suitable reducer gearing 42 rotates a sprocket wheel 43 which engages chain 41. The system operates as follows. Assuming first a period during which no wire is being taken up from the belt 3, e.g. an idling period of the intermittently operating machine to which the wire is to be supplied, then the uniform rightward advance of the belt 3 acting by way of sprocket chain 41 and sprocket wheel 43 causes the truck 39 to advance rightward along its ways at an equal rate to that of the belt, as indicated by the arrow, and the truck remains constantly in overlying relation with the same endmost loop of wire on the belt. When wire is being taken up from the belt, pulley 38 is rotated, thereby rotating the sprocket 43. This imparts to the truck 39 a component of displacement relative to the chain 41 so that the truck 39 is now displaced relatively to the belt in a leftward direction and at a rate such, as predetermined by the reducing ratio of the gearing 42 and diameter of the pulley 38, as to correspond with the displacement between adjacent loops on the belt, so as to be constantly maintained in a position directly overlying the endmost loop to be lifted. Thus, assuming that the takeup rate is uniform and equal to the rate of feed-out, the truck 39 will now retain a stationary condition in space.

FIG. 12 illustrates a modified take-up arrangement for achieving a similar purpose. The wire take-up pulley 46 has an internally threaded opening and engages nut-like a screw shaft 47 which is rotated from the belt-operating mechanism e.g. by way of a drive system 48 comprising a chain drive and gearing. The pitch of screw shaft 47 is so predetermined that every time a length of wire equivalent to one loop has been take up by pulley 46, the pulley is rotated by an amount such that it is caused to advance axially on the shaft 47 by an amount corresponding to the displacement between adjacent loops on the belt 3. The over-all result is exactly similar to that obtained with the device of FIGS. 10 and 11 since, as will be evident from the drawing, the shaft 47 acts during the periods where take-up of wire is interrupted to push the pulley 46 rightward in synchronism with the advance of the belt 3.

Figure 13:
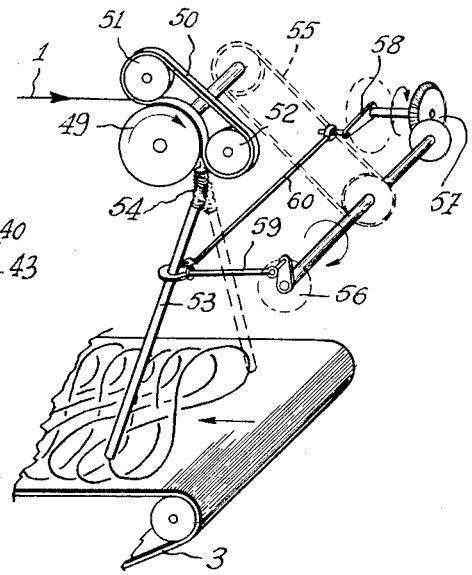
FIG. 13 shows a feeler device arranged to cast FIGURE 8 loops.

Means will now be described for casting off the wire in figure-8 loops on the belt, with reference to FIG. 13. The wire is fed by means of a pulley 49, the wire being applied against the periphery of the pulley by presser belt 50 trained over pulleys 51, 52. From pulley 49 the wire 1 is fed into a tubular guide member 53 which is mounted flexibly at its upper end at 54 so as to be capable of swinging freely about its mounting. A collar freely surrounding the tubular guide 53 at an intermediate point of it is connected by way of two links 59 and 60 extending substantially at right angles to each other, with respective crankpins driven by way of related cranks 56 and 58 from two respective shafts at right angles to each other; the two shafts are interconnected by way of bevel gearing 57 having a ratio such that crank 58 is rotated at a slower rate, e.g. twice slower, than is crank 56. The shaft carrying one of the cranks, e.g. crank 56, is rotated through a belt drive 55 from the feeder pulley 49. It will readily be understood that on rotation of the feeder pulley to feed the wire 1 through the guide tube 53 said guide tube has imparted to it through the mechanism described a dual reciprocatory movement whereby the wire is laid down in figure-eight loops upon the conveyor 3. The system just described is usable in conjunction with any of the other system hereinabove described.

According to a feature of the invention, a wire-drawing device may advantageously be provided directly ahead of the feed-out unit in a system according to the invention, so that the feed-out unit delivers loops of cold-worked wire.

Various modifications may be made in the construction of the individual components of the system without exceeding the scope of the invention. Thus the feed-out unit for casting off circular loops of wire, instead of being constructed in the manner shown in FIGS. 5 to 8, may assume a form resembling that of the feed-out unit of FIG. 13, except that the linkage actuating the tubular guide 53 would be designed to swing said guide in a circular, rather than a figure-8 path.

What I claim is:

1. In a flexible wire storing device, a conveyer adapted to be displaced in a predetermined direction, a feedout unit associated with said conveyor and operable to cast off loops of said wire on to a first area of the conveyor while said conveyor is moving to form a spread-out array of overlapping loops over the conveyor surface, a take-up unit supported over a second area of the conveyor spaced from said first area and operable to draw in said wire upwardly from the array of loops, means for displacing the conveyor from the feedout unit towards the takeup unit, and means for imparting displacement to said take-up unit in a direction parallel to the direction of conveyor displacement so as to maintain the takeup unit at all times in substantial vertical alignment with an endmost loop of said array.

2. In a flexible wire storing device, a conveyor adapted to be displaced in a predetermined direction, a feedout unit associated with said conveyor and operable to cast off loops of said wire on to a first area of the conveyor while said conveyor is moving, a takeup unit supported over a second area of the conveyor and including a pulley over which said wire is trained, said pulley being rotatable to lift said wire upwardly from the conveyor, conveyor drive means for displacing the conveyor from the feedout to the takeup unit, means operated by the conveyor drive means for displacing the pulley in the same direction and at the same rate as the conveyor, and means operated by rotation of the pulley for imparting to the pulley a corrective displacement in the opposite direction, whereby to maintain said pulley at all times in substantial vertical alignment with an endmost loop on the conveyor.

3. In a device as defined in claim 2, wherein said takeup unit comprises a truck displaceable over a path parallel to and spaced above the conveyor and said pulley is rotatably supported from said truck, a sprocket on said truck, a sprocket chain engaged by the conveyor drive means and engaging said sprocket to advance said truck in synchronism with the conveyor, and means for rotating the sprocket from the pulley to impart a corrective displacement to said truck in a direction opposite to the direction of conveyor displacement upon rotation of the pulley to take up said element.

4. In a device as defined in claim 2, a screw shaft extending parallel to and spaced above the conveyor, said pulley having a threaded axial aperture engaging the screw thread of the shaft, and means for rotating the screw shaft from the conveyor drive means.

5. In a flexible wire storing device, a feedout unit for casting off loops of said wire comprising a relatively stationary sheave having a partly spherical configuration towards its input side and a generally cylindrical configuration towards its output side, wire distributor means rotatable relatively to said sheave coaxially therewith for winding a plurality of turns of wire about the sheave starting from said input side of the latter, and pusher means comprising a roller journalled on said rotatable distributor means about an axis extending substantially through the axis of the sheave and having a surface directed toward said sheave which substantially conforms with said partly-spherical sheave configuration for gradually pushing said turns axially of the sheave towards the output side of the sheave as the turns are formed and overlie said cylindrical portion, whereby the endmost turns at the output side are progressively released and cast off in the form of generally circular loops.

6. In a flexible wire storing device, a feedout unit including a generally cylindrical sheave, means for winding turns of said wire around the sheave from an input side thereof, means for pushing said turns upwardly towards an output side of the sheave whereby loops of said wire are cast off one by one from said sheave, a first conveyer having a surface area disposed to receive said loops as they are cast off, an auxiliary conveyer cooperating with said feedout unit and said first conveyer to grip a portion of each loop as it is cast off from said sheave between the cooperating surfaces of both conveyers, whereby to guide said one loop portion positively on to the surface of said first conveyer, and a guide member having sloping surfaces and projecting from said sheave with at least one sloping surface in overlying relationship with the surface of said first conveyer for guiding another portion of each loop diametrically opposed to said first portion until both loop portions of each loop have been deposited on said first conveyer surface, takeup means spaced from said feedout unit for drawing said wire upwardly from the first conveyer, and means displacing said first conveyer from said feedout unit towards said takeup unit.

References Cited in the file of this patent

UNITED STATES PATENTS

| | | |
|---|---|---|
| 1,806,805 | Knapp | May 26, 1931 |
| 1,862,676 | Gitzendanner | June 14, 1932 |
| 1,898,535 | Haupt et al. | Feb. 21, 1933 |
| 1,911,961 | Melnick | May 30, 1933 |
| 1,915,713 | Bennett | June 27, 1933 |
| 2,072,554 | Greene | Mar. 2, 1937 |
| 2,223,011 | Stephens | Nov. 26, 1940 |
| 2,223,354 | DeMiller | Dec. 3, 1940 |
| 2,331,294 | Bank et al. | Oct. 12, 1943 |
| 2,333,278 | Truesdail | Nov. 2, 1943 |
| 2,684,087 | Stockton | July 10, 1954 |
| 2,743,066 | Crum | Apr. 24, 1956 |
| 2,849,195 | Richardson et al. | Aug. 26, 1958 |
| 2,954,180 | Crum | Sept. 27, 1960 |